Patented Apr. 13, 1937

2,076,555

UNITED STATES PATENT OFFICE 2,076,555

CELLULOSE DERIVATIVE AND PROCESS OF MAKING THE SAME

Robert E. Fothergill, Wilmington, Del., assignor to E. I. du Pont de Nemours & Company, Wilmington, Del., a corporation of Delaware No Drawing. Application December 21, 1933, Serial No. 703,405

16 Claims. (Cl. 260—102)

This invention relates to a process of making propionic acid esters of cellulose and more particularly to a process for making propionic acid esters of cellulose insoluble in benzene but soluble in acetone.

The art on the preparation of cellulose acetate is extensive, much of this art including references to cellulose propionate. The two esters are, however, different in many of their properties and particularly in their solubilities, so that a procedure applicable in the case of the acetate is quite frequently ineffective in the preparation of the propionate. So far as is known, a propionate such as prepared by the process of the present invention, namely one insoluble in benzene while soluble in acetone, is unknown.

This invention has as an object the preparation of propionic acid esters of cellulose by an improved procedure. A further object is the preparation of propionic acid esters of cellulose of improved quality. A further object is a propionic acid ester insoluble in benzene but swollen thereby and soluble in acetone. Other objects will appear hereinafter.

The above objects are accomplished by the following invention wherein cellulose or a low substituted cellulose derivative is propionated by reaction with propionic anhydride preferably in the presence of a diluent such as propionic acid and a catalyst such as sulfuric acid, the primary ester thus produced being then hydrolyzed until a propionate insoluble in benzene is obtained. The invention is exemplified in the following examples wherein quantities of material are expressed as parts by weight.

Example 1

A solution of 7.5 parts of concentrated sulfuric acid in 500 parts of propionic acid is thoroughly mixed with 500 parts of air-dry cotton linters and allowed to stand for 24 hours at 25° C. These pretreated linters are then thoroughly mixed with 2500 parts of propionic anhydride and 1500 parts of propionic acid, previously cooled to about 20° C. The temperature of the reaction mass rises rapidly during 15 minutes to about 38° C. and then more slowly during the next 45 minutes to 42–45° C. The temperature is held below 45° C. by any suitable means of agitation and, if necessary, external cooling. At this stage the mixture is a sticky mass of swollen fibers. After about 45 minutes at 43–45° C. a viscous fibrous solution forms and the temperature of the reaction mass begins to fall. The reaction mixture is then allowed to stand without external cooling until a viscous solution free of fibers is obtained, which requires a total esterification time of about 22–26 hours with the final temperature at about 25° C. One thousand parts of 60% propionic acid is now stirred in to stop the esterification and 15 minutes later 1000 parts of 60% propionic acid containing 55 parts of concentrated sulfuric acid is stirred in uniformly. The reaction mass is then allowed to stand for 30 hours at 35° C. or until a sample precipitated therefrom is found to be insoluble in benzene but still soluble in butyl acetate and acetone. At this stage the reaction mixture is poured into an excess of water with violent agitation and the precipitated propionate washed free of acid and dried at about 65° C. This cellulose propionate has about 64.4% combined propionic acid and is especially suitable for use in the manufacture of plastics.

Example 2

Fifty parts of air-dried cotton linters are mixed with 25 parts of propionic acid and 1.25 parts of concentrated sulfuric acid and allowed to stand at room temperature (25° C.) for 24 hours. The treated linters are then mixed with 250 parts of propionic anhydride and 175 parts of propionic acid, previously cooled to 22° C., and after thorough mixing the reaction mixture is allowed to stand with no external cooling. In 15 minutes the temperature of the reaction mass rises to 37° and stays at 37–38° for about one hour, and at this point the reaction mass consists of sticky, swollen fibers. The temperature of the reaction mass gradually decreases until after a total reaction time of 12.5 hours the temperature is 31° C. and the reaction mixture is a viscous solution practically free of fibers. The primary cellulose propionate is hydrolyzed in a manner similar to that described in Example 1. One hundred parts of 60% propionic acid is stirred in to stop the propionation and then 100 parts of 60% propionic acid containing 5 parts of concentrated sulfuric acid is stirred in and the propionate hydrolyzed at 43° C. for 16 hours. At this point the reaction mixture is poured into water and the cellulose propionate washed free of acid and dried at 65° C. This cellulose propionate is insoluble in benzene but is soluble in butyl acetate and acetone and films prepared from it are very flexible.

Example 3

A primary cellulose propionate is prepared in exactly the same manner as that described in Example 2 but in this case the primary propionate is given a stronger hydrolysis. After stirring in 100 parts of 60% propionic acid to stop the propionation a solution of 100 parts of 60% propionic acid containing 20 parts of concentrated sulfuric acid is then stirred in and hydrolyzed at 43° C. for about 16 hours. After precipitating the cellulose propionate at this stage it is washed until acid-free and dried. The resulting cellulose propionate is insoluble in, but swollen by, both butyl acetate and benzene, and is soluble in acetone, "Methyl Cellosolve" (beta methoxyethanol) and dioxan.

It is seen that in comparison with the process of Example 2 the stronger hydrolysis of the process of Example 3 leads to a product insoluble in butyl acetate.

Example 4

Five hundred parts of air-dried cotton linters are mixed with 5000 parts of 98% formic acid and 100 parts of anhydrous zinc chloride and allowed to stand at 25° C. for 24 hours. The treated linters are then centrifuged to remove excess formic acid, washed free of acid and dried rapidly at 65° C. These pretreated linters (which contain 13.6% combined formic acid) are then mixed with 2100 parts of propionic anhydride, 2800 parts of propionic acid and 15 parts of concentrated sulfuric acid, previously cooled to 19° C. The temperature of the reaction mass gradually rises to about 47–48° C. during a period of 2.5 to 3 hours and then gradually decreases. At the end of 3.5 or 4 hours the reaction mixture is a gelatinous mass of swollen fibers and at the end of 8 hours the reaction mixture is a viscous grainy gum and the temperature has dropped to 34° C. At this time 1000 parts of 60% propionic acid is stirred in over a period of about one-half hour and then 1200 parts of 60% propionic acid containing 50 parts of concentrated sulfuric acid is stirred in rapidly. The hydrolysis is carried out at 31° C. for a period of 17 hours. The secondary propionate thus formed is precipitated, washed and dried in the usual manner. This cellulose propionate is insoluble in benzene, chloroform, and butyl acetate and forms grainy solutions in acetone. However, this propionate forms films of extremely high flexibility when cast from the proper solvent mixture. It contains 61.6% combined propionic acid.

Example 5

Five hundred parts of air-dried cotton linters are thoroughly mixed with 5000 parts of 88% formic acid containing 15 parts of concentrated sulfuric acid and allowed to stand 24 hours at 25° C. The pretreated linters are centrifuged to remove the excess acid then washed acid free and dried rapidly at 65° C. Cotton linters pretreated in this manner contain about 7% combined formic acid. These treated linters are propionated, in a manner similar to that described in Example 4, with 2100 parts of propionic anhydride, 2800 parts of propionic acid and 10 parts of concentrated sulfuric acid. The temperature of the reaction mass gradually increases from 23° to a maximum of 42° in 2¾ hours and then gradually decreases during the remainder of the reaction time. At the end of 8¼ hours total reaction time a high viscosity solution which is practically free of fibers is obtained. The primary cellulose propionate is hydrolyzed by first stirring in 1000 parts of 60% propionic acid, then 1200 parts of 60% propionic acid containing 66 parts of concentrated sulfuric acid, and allowing to stand at a temperature of 45° C. for 16 hours (or until a sample precipitated in ether and dried shows that the propionate is just insoluble in butyl acetate but still soluble in acetone). The secondary cellulose propionate is precipitated in excess water, washed until acid-free and dried at 65° C. This type of cellulose propionate contains 59.9% propionic acid and is soluble in acetone, dioxan, and methoxyethanol but insoluble in chloroform, benzene, and butyl acetate. Films of this propionate are extremely flexible when cast from suitable solvent mixtures and are especially suitable for use in plastics and photographic film.

In Examples 4 and 5 there has been made mention of a suitable solvent mixture. Such a solvent mixture is one containing 62% acetone, 21% butyl acetate and 17% ethyl alcohol. The butyl acetate is a non-solvent liquid which acts as the swelling agent for the propionate. The proportions of all three components of this solvent mixture may be varied to some extent. Ethyl acetate-methyl alcohol mixture or other active solvents or solvent mixtures may replace the acetone-ethyl alcohol mixture. Amyl acetate, benzene, toluene, ethylene dibromide, ethyl butyrate, and other non-solvents may replace the butyl acetate. The amount of non-solvent is so proportioned as to prevent blushing but should be present in an amount insufficient to prevent solution. Such solvent mixtures as these are applicable to the propionates of all the examples.

The cellulosic material which may be used in the process of the present invention includes not only cotton linters but any cellulosic compound containing the cellulose nucleus and having esterifiable cellulosic hydroxyl groups. Purified wood pulp, bagasse pulp, etc., may be used. Various pretreated celluloses and partially substituted celluloses may be used. Thus, low substituted cellulose derivatives such as ethyl cellulose, benzyl cellulose, crotyl cellulose, and other cellulose ethers, cellulose acetate, cellulose nitrate, and other cellulose esters, may be employed in this process. The different substituents naturally have an effect upon the solubility characteristics of the resulting propionic acid ester. For this reason a cellulose nitrate to be propionated should contain less than 1 mol. of nitrate radical per glucose unit, a benzyl cellulose perhaps ⅛ mol. or less benzyl, the methyl and ethyl celluloses perhaps ¼ mol. or less of methyl or ethyl radical respectively per glucose unit. When these low substituted derivatives are used there is produced a mixed cellulose derivative of propionic acid with the other radical present in the starting material and the properties of the final product will be modified by the kind and amount of other group present.

The cellulosic material may be given any pretreatment desired before propionation. Pretreatments with propionic and sulfuric acid, and with formic acid, as given in the examples above are not limited to these exact procedures. In the formic acid pretreatment any procedure which will introduce more than about 3% combined formic acid will give a product capable of being very readily propionated. With less than 3% combined formic acid the pretreated celluloses are less uniformly esterified. Best results are obtainable if not more than 18%, and preferably not more than 13% formyl radical, calculated as formic acid, is introduced. Formic acid of 70% concentration or higher may be used with or without catalysts. The amount of formic acid introduced into the cellulose is dependent on the strength of acid used, the time and temperature of treatment, and the amount of catalyst present. For example, cotton linters treated with 70% formic acid for 40 hours at 25° C. will give a product containing about 3% combined formic acid; a treatment with 98% formic acid for 24 hours at 25° will give a product containing about 8% formic acid; a treatment with 98% formic acid containing 20% zinc chloride as catalyst for a period of 24 hours at 25° will give a product containing about 12.5% combined formic acid; and a treatment with 90% formic acid for one hour at 107° C. will give a product containing about 6% combined formic acid. All of these products are quite readily esterified with propionic anhydride. However, the preferred procedures are those given in the examples. It is very important to dry the formic acid treated linters very rapidly; otherwise the moisture present will hydrolyze the cellulose formate rapidly and thus reduce the formic acid content of the cellulose below the amount necessary for a satisfactory propionation.

Other procedures than those described in the examples may be used in the pretreatment or activation of cellulose with sulfuric and propionic acids. The time of pretreatment may be varied from a few hours, say 2 or 3, up to 36 hours or longer and the temperature of pretreatment may be varied from 0° C. to 35 or 40° C., but best results are obtained using a pretreatment for 24 or 36 hours at temperatures of 18–25° C. The amount of catalyst used in this activation step may be varied from 1 to 5% of the weight of cellulose (in the case of sulfuric acid); however, concentrations of 1.5 to 2.5% give products of better quality. The amount of propionic acid may be varied from as little as 15% or less of the weight of the cellulose to as much as 400% or more. However, an amount of propionic acid equal to 50% to 100% of the weight of the cellulose, is preferably used.

Some of the other pretreatments which may be used are as follows: Cellulose may be mercerized with 18% sodium hydroxide solution, the cellulose then washed alkali free and the water displaced successively with methanol, then benzene or some other liquid which is not miscible with water, then dried in the presence of this liquid which is not miscible with water. The cellulose may also be treated with propionic acid in the absence of any catalyst, and the catalyst and anhydride added later. Another modification consists of treating the cellulose with a large excess of propionic acid or propionic anhydride or mixtures of these, with or without a catalyst, to impregnate the fibers uniformly and then removing the excess of acid from the cellulose fibers and completing the esterification by adding the remainder of the propionating solution.

The cellulose may also be pretreated or activated through addition of a mixture of propionic acid and anhydride, esterification being afterward initiated by addition of catalyst alone or dissolved in additional propionic acid and/or propionic anhydride. Another possible but less desirable pretreatment is with propionic anhydride alone; the primary ester is then formed by adding a catalyst together with propionic acid or other solvent and heating if necessary.

This invention is not limited to the use of sulfuric acid as the catalyst in the esterification step. Other catalysts such as perchloric acid and zinc chloride-hydrogen chloride mixtures may also be used.

Other solvents than propionic acid may also be used in this procedure. As examples of some of the other solvents that may be used, methylene chloride, ethylene dichloride, dichlorethylene and chloroform, may be mentioned.

The pretreated linters may be propionated by other procedures than those given in the examples. The time of esterification depends greatly on the temperature and the amount of catalyst present and also on the amount of activation or pretreatment which has been given the cellulose. Esterification may be carried out at any temperature from 0° to about 60° C. However, temperatures between 20 and 45° C. are preferred. The temperature may be maintained at any definite point by means of agitation and external cooling or heating or it may be allowed to rise gradually from 20° or lower during a period of three or four hours to a maximum temperature of 40 or 45° and held at that temperature until the cellulose is completely in solution, also the heat of reaction may be allowed to carry the temperature of the reaction mass up to the maximum temperature in a short time and then allowed to gradually decrease during the later stages of the esterification.

This process may be carried out in any suitable type of apparatus such as rotating drums, containers fitted with mechanical agitators, or in W. and P. type mixers, constructed of suitable material such, for example, as stainless steel, copper, etc. The apparatus should be equipped with suitable means for controlling the temperature of the reaction mass.

It is necessary to subject the primary esterification products to a partial hydrolysis or saponification treatment even though the cellulose tripropionate is soluble in a much wider variety of solvents than cellulose triacetate. A partial hydrolysis treatment produces a cellulose propionate having vastly superior properties for use in films or plastics or for other commercial uses. Various procedures may be used in carrying out this partial hydrolysis step. Cellulose tripropionate may be precipitated as such and then redissolved in aqueous propionic acid of the desired concentration, the required amount of water may be added directly to the primary esterification mixture, or dilute propionic acid may be added instead of water alone, the essential point being that sufficient water be present in the hydrolyzing bath to remove all excess anhydride and to react with the tripropionate to remove the desired amount of propionyl radical. Satisfactory results may be obtained using hydrolyzing baths of different concentrations. The concentration of propionic acid in the propionic acid-water mixture may vary from 88 to 94.5% and the total weight of the propionic acid-water mixture may vary from 11 to 16 times the weight of the cellulose in the cellulose ester being hydrolyzed. The amount of catalyst used in the hydrolysis step may be varied over wide limits. It is not even necessary to add any more catalyst than that present during the esterification step; however, in this case the rate of hydrolysis is very slow. Satisfactory results have been obtained using an amount of sulfuric acid as high as 63% of the weight of the cellulose used in preparing the cellulose propionate. The preferred concentrations of sulfuric acid are between 12.5 and 45%.

The temperature of hydrolysis may be varied from room temperature to as high as 55–60° but operation at 35–45° is preferred. The most important condition of the hydrolysis step is the continuance of the hydrolysis until a propionate insoluble in benzene is obtained. These most valuable products are obtained by continuing the hydrolysis until the cellulose propionate is insoluble in but swelled by benzene but is still soluble in acetone and methoxyethanol. This change in solubility of the cellulose propionate can readily be followed during the course of the hydrolysis by removing small samples at regular intervals, precipitating the ester in ether and drying. The primary cellulose tripropionate is soluble in acetone, chloroform, benzene, ethylacetate and butyl acetate but insoluble in methoxyethanol. Within the range of benzene insoluble and acetone soluble products there are products which are soluble and insoluble in methoxyethanol, the soluble products being obtained after longer hydrolysis. Among the products soluble in methoxyethanol there are products soluble in and insoluble in butyl acetate, the products insoluble in butyl acetate being obtained by a longer continued hydrolysis.

When formic acid treated cellulose, particularly cotton linters, is used in the process of the present invention the resulting primary ester is a mixed formate-propionate. The formate radical is the more readily hydrolyzed and is therefore removed first in the hydrolysis step. The final product therefore contains only propionyl groups. Since the rate of hydrolysis of cellulose formate is much more rapid than that of cellulose propionate, the mixed formate-propionates containing higher amounts of formyl radical require less drastic conditions, for example a shorter time, for the hydrolysis step to give a final product of the desired solubility characteristics. Mixed formate-propionates having from 1.5 to 8.0% combined formic acid are particularly suitable.

The cellulose propionate prepared according to the process of the present invention is particularly suited for use in the manufacture of films, plastics, coating compositions, lacquers, artificial fibres and bristles, and for use in the manufacture of safety glass. Its high flexibility, great clarity and low water sensitivity render it particularly advantageous for these uses.

The present invention affords an improved process for the manufacture of cellulose propionate and the products of the process because their solubility characteristics are more useful than the cellulose propionates prepared according to the processes hitherto known. The process of the present invention gives a cellulose propionate of improved physical properties such as flexibility, etc. The product is more compatible with plasticizers and resins than is cellulose acetate, but not quite as compatible as a cellulose propionate of higher degree of substitution. This latter is of obvious advantage. A particular advantage resides in one phase of the invention, namely in solutions of the cellulose propionates of the present invention in a solvent mixture containing as its highest boiling or least volatile component a liquid which swells but does not dissolve the cellulose propionate. Films of improved flexibility and clarity are obtained from solutions in such a solvent mixture. The clarity of the film is all the more surprising in view of the fact that the high boiling constituent is not a true solvent for the cellulose propionate although it may swell the same. A further advantageous phase of the invention is the cellulose propionate which is insoluble in but swelled by both benzene and butyl acetate.

As many apparently widely different embodiments of this invention may be made without departing from the spirit and scope thereof, it is to be understood that I do not limit myself to the specific embodiments thereof except as defined in the appended claims.

I claim:

1. Process of preparing a propionic acid ester of cellulose which comprises reacting a member of the group consisting of cellulose and low substituted cellulose derivatives with propionic anhydride and submitting the propionic aced ester thus obtained to hydrolysis until a product insoluble in benzene but soluble in acetone is obtained.

2. Process of preparing cellulose propionate comprising reacting propionic anhydride with a member of the class consisting of cellulose and low substituted cellulose formate and submitting the resulting primary cellulose ester to hydrolysis until a product insoluble in benzene but soluble in acetone is obtained.

3. Process of preparing cellulose propionate comprising reacting a member of the class consisting of cellulose and low substituted cellulose formate with propionic anhydride in the presence of propionic acid and a catalyst and submitting the resulting primary cellulose ester to hydrolysis until a product soluble in acetone but insoluble in benzene is obtained.

4. Process of preparing cellulose propionate which comprises reacting cellulose with propionic anhydride and submitting the primary cellulose propionate thus obtained to hydrolysis until a product soluble in acetone and insoluble in benzene is obtained.

5. Process for preparing cellulose propionate comprising treating cellulose with propionic acid in an amount not greater than that of the cellulose and with a catalyst, esterifying the resulting pretreated cellulose with propionic anhydride and hydrolyzing the primary propionate thus obtained until a product soluble in acetone and insoluble in benzene is obtained.

6. Process of preparing cellulose propionate which comprises treating cellulose with propionic acid in amount not greater than that of the cellulose and with sulfuric acid in an amount of 1–5% based on the cellulose, esterifying the resulting pretreated cellulose with propionic anhydride and hydrolyzing the primary propionate thus obtained until a product soluble in acetone and insoluble in benzene is obtained.

7. Process of preparing cellulose propionate comprising treating cellulose with propionic acid in amount up to 100% by weight of the cellulose used and with sulfuric acid in an amount of 1–5% by weight of the cellulose used, esterifying the resulting pretreated cellulose with propionic anhydride in the presence of additional propionic acid and hydrolyzing the primary propionate thus obtained until a product soluble in acetone and insoluble in benzene is obtained.

8. Process of preparing a cellulose ester of propionic acid which comprises reacting a member of the group consisting of cellulose and lower substituted cellulose derivatives with propionic anhydride and submitting the propionic acid ester thus obtained to hydrolysis until there is obtained a product which is insoluble in benzene, insoluble in butyl acetate and soluble in acetone.

9. A propionic acid ester of cellulose insoluble in benzene and soluble in acetone.

10. A propionic acid ester of cellulose insoluble in benzene, insoluble in butyl acetate and soluble in acetone.

11. A propionic acid ester of cellulose insoluble in benzene and soluble in acetone, said ester being obtainable by reacting propionic anhydride with a member of the class consisting of cellulose and lower substituted cellulose derivatives and subsequently hydrolyzing the primary ester thus obtained until the ester is insoluble in benzene and soluble in acetone.

12. A propionic acid ester of cellulose prepared by hydrolyzing cellulose propionate until it is insoluble in benzene and soluble in acetone.

13. A propionic acid ester of cellulose prepared by hydrolyzing cellulose propionate until it is insoluble in benzene, insoluble in butyl acetate, and soluble in acetone.

14. Process of preparing cellulose propionate which comprises reacting cellulose formate having 3-13% combined formic acid with propionic anhydride and subjecting the resulting propionate-formate to hydrolysis until a product essentially free from formyl radical soluble in acetone, and insoluble in benzene is obtained.

15. Process of preparing cellulose propionate comprising reacting cellulose formate having 3-13% combined formic acid with propionic anhydride in the presence of a catalyst and a diluent and subjecting the resulting cellulose propionate-formate to hydrolysis until a product essentially free from formyl radical, soluble in acetone, and insoluble in benzene is obtained.

16. Process of preparing cellulose propionate comprising reacting cellulose formate having 3-13% combined formic acid with propionic anhydride in the presence of a catalyst and propionic acid and subjecting the resulting cellulose propionate-formate to hydrolysis until a product essentially free from formyl radical, soluble in acetone, and insoluble in benzene is obtained.

ROBERT E. FOTHERGILL.